US012613116B2

(12) United States Patent　　　(10) Patent No.: US 12,613,116 B2
　　Glickman et al.　　　　　　　　(45) Date of Patent: Apr. 28, 2026

(54) ELECTRONIC DEVICES WITH MULTI-FUNCTION ENVIRONMENTAL SENSORS

(71) Applicant: Apple Inc., Cupertino, CA (US)

(72) Inventors: Michael J Glickman, Mountain View, CA (US); David MacNeil, San Mateo, CA (US); John P Bergen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 18/321,456

(22) Filed: May 22, 2023

(65) Prior Publication Data

US 2024/0085223 A1　　Mar. 14, 2024

Related U.S. Application Data

(60) Provisional application No. 63/405,100, filed on Sep. 9, 2022.

(51) Int. Cl.
　　*G01D 21/02*　　　(2006.01)
　　*G01J 1/44*　　　(2006.01)
　　　　　　(Continued)

(52) U.S. Cl.
　　CPC ................ *G01D 21/02* (2013.01); *G01J 1/44* (2013.01); *G01K 17/00* (2013.01); *G01P 5/12* (2013.01); *G01J 2001/4266* (2013.01)

(58) Field of Classification Search
　　CPC .... G01D 21/02; G01J 1/44; G01J 2001/4266; G01K 17/00; G01P 5/12; G01W 1/02
　　See application file for complete search history.

(56) References Cited

U.S. PATENT DOCUMENTS 10,809,131 B2 * 10/2020 Daraio ..................... G01J 5/24
2008/0282791 A1 11/2008 Nakano et al.
(Continued)

OTHER PUBLICATIONS

Izhar et al., "CMOS Compatible MEMS Air Velocity Sensor With Improved Sensitivity and Linearity for Human Thermal Comfort Sensing Applications," IEEE Sensors Journal, Nov. 1, 2021, pp. 23872-23879, vol. 21, No. 21, IEEE, New York, NY.
(Continued)

*Primary Examiner* — Francis C Gray

(74) *Attorney, Agent, or Firm* — Treyz Law Group, P.C.; David K. Cole

(57) ABSTRACT

An electronic device may include an environmental sensor. In particular, the sensor may include a layer of metal and be operable as an anemometer, a thermometer, a bolometer, and/or a heat flux sensor. To operate as an anemometer or thermometer, circuitry may heat the layer of metal and calculate an air speed based on a decay of the metal temperature. To operate as a bolometer, a first portion of the metal may have a first optical absorption/insulation (e.g., be insulated), while a second portion may have a second optical absorption/insulation (e.g., be uncoated). Differences in heating/cooling of the first and second portions may be used to measure solar radiation. To operate as a heat flux sensor, different metals may be used, and Seebeck voltages between the different metals may be measured. The metal may be deposited on the housing or may be incorporated into a mesh on the device.

18 Claims, 10 Drawing Sheets

(51) Int. Cl.
    *G01K 17/00*         (2006.01)
    *G01P 5/12*         (2006.01)
    *G01J 1/42*         (2006.01)

(56) References Cited

U.S. PATENT DOCUMENTS

| | | |
|---|---|---|
| 2009/0164163 A1 | 6/2009 | Wang et al. |
| 2019/0339298 A1* | 11/2019 | Bonanomi ............ G01F 1/6847 |
| 2021/0177198 A1* | 6/2021 | Keller ...................... G01K 1/14 |

OTHER PUBLICATIONS

Li Wenbo et al., "Daily Thermal Rating Calculation of Overhead Conductor Driven by Meteorological Data," The 10th International Conference on Communications, Circuits and Systems, Dec. 22-24, 2018, pp. 79-83, IEEE, New York, NY.

* cited by examiner

APPLY VOLTAGE TO FIRST
AND SECOND METAL
LAYERS                                    810

MEASURE SEEBECK
VOLTAGES AT JUNCTIONS
BETWEEN THE FIRST AND
SECOND METAL LAYERS                       812

DETERMINE HEAT
FLUX BASED ON THE
SEEBECK VOLTAGES                          814

ELECTRONIC DEVICES WITH MULTI-FUNCTION ENVIRONMENTAL SENSORS

This application claims the benefit of provisional patent application No. 63/405,100, filed Sep. 9, 2022, which is hereby incorporated by reference herein in its entirety.

FIELD

This relates generally to electronic devices, and, more particularly, to electronic devices with environmental sensors.

BACKGROUND

Electronic devices such as laptop computers, cellular telephone, and other equipment are sometimes provided with environmental sensors, such as ambient light sensors, image sensors, and microphones. However, it may be difficult to incorporate some environmental sensors into an electronic device where space is at a premium.

SUMMARY

An electronic device may include a housing, a display in the housing, and an environmental sensor coupled to the housing. The environmental sensor may be a multi-function environmental sensor formed from a layer of metal, such as a resistive thermal device, on the housing. In particular, the multi-function environmental sensor may be operable as an anemometer, thermometer, bolometer, and/or heat flux sensor.

To operate as an anemometer or thermometer, control circuitry may heat the layer of metal and calculate an air speed based on a decay of the metal temperature. In particular, a reference resistor that is internal to the device may be heated by the same amount as the layer of metal, and the decay rates of the layer of metal and reference resistor may be compared to determine the air speed. To operate as a bolometer, a first portion of the metal may have a first optical absorption/insulation (e.g., be insulated), while a second portion may have a second optical absorption/insulation (e.g., be uncoated). Differences in heating/cooling of the first and second portions may be used to measure solar radiation. To operate as a heat flux sensor, multiple layers of different metals may be used, and Seebeck voltages between the different metals may be measured.

The metal may be deposited on the housing directly (or with an intervening insulator layer), or may be incorporated into a mesh that covers a component within the housing. For example, the metal may be incorporated into a mesh that covers a microphone, speaker, or sensor.

DETAILED DESCRIPTION

Electronic devices are often carried by users as they conduct their daily activities. For example, a user may carry an electronic device on their person throughout the day while walking, commuting, working, exercising, etc. In some situations, it may be desirable for the user to know the air speed, ambient temperature, solar radiation, presence of water in the device's surroundings, and/or the heat flux across a housing of the device.

To make one or more of these measurements, a layer of metal may be coupled to the device housing, or a strand of metal may be incorporated into a mesh that covers one or more components, such as a speaker or microphone, inside of the electronic device. The layer or strand of metal may be heated to a known temperature, and the decay of the temperature of the metal back to an equilibrium temperature may indicate the air speed. To measure ambient temperature, a reference resistor may be used, and the decay of the temperature of the metal may be compared to the decay of the reference resistor. Alternatively or additionally, the layer of metal may include multiple metals, or multiple strands of different metals may be incorporated into the mesh, and Seebeck voltages across junctions between the different metals may indicate the heat flux across the device housing. If desired, the layer or strands of metal may be used to determine solar radiation and/or the presence of water (if other unknowns can be determined, such as by modifying the layer of metal to have portions with different insulation). In this way, the layers or strands of metal may be used as an anemometer, thermometer, bolometer, water sensor, and/or heat flux sensor.

Figure 1:
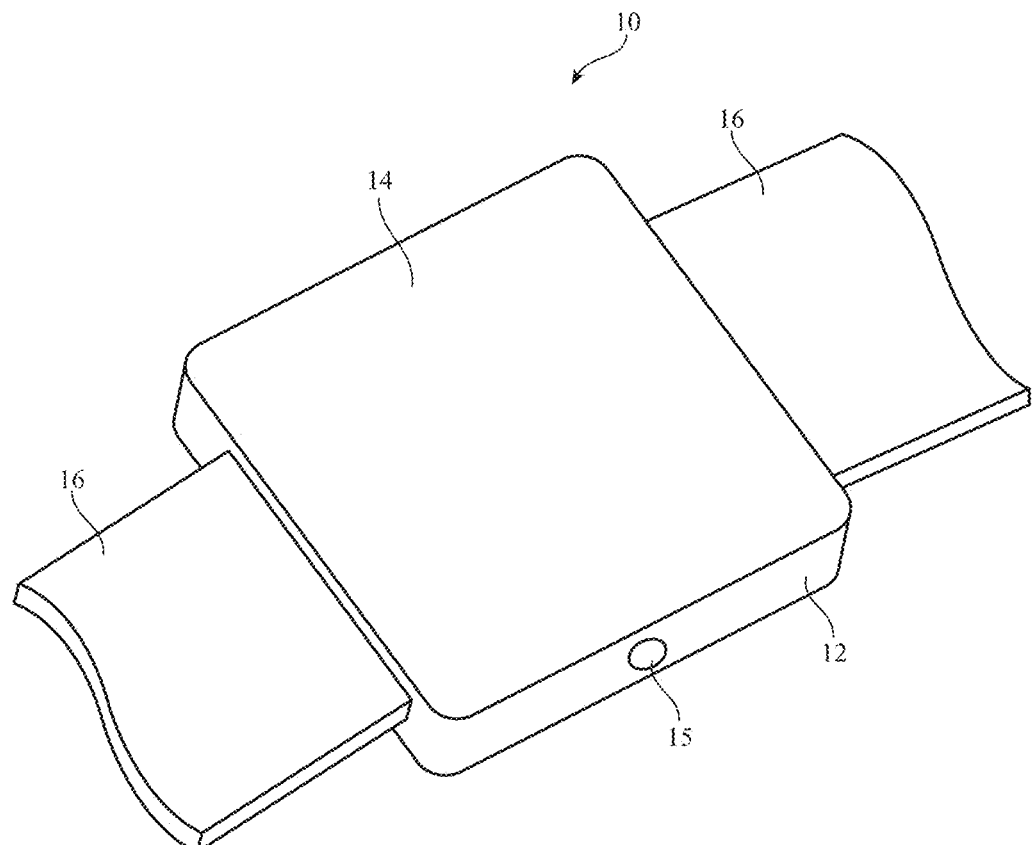
FIG. 1 is a drawing of an illustrative wearable electronic device in accordance with various embodiments.
Figure 2:
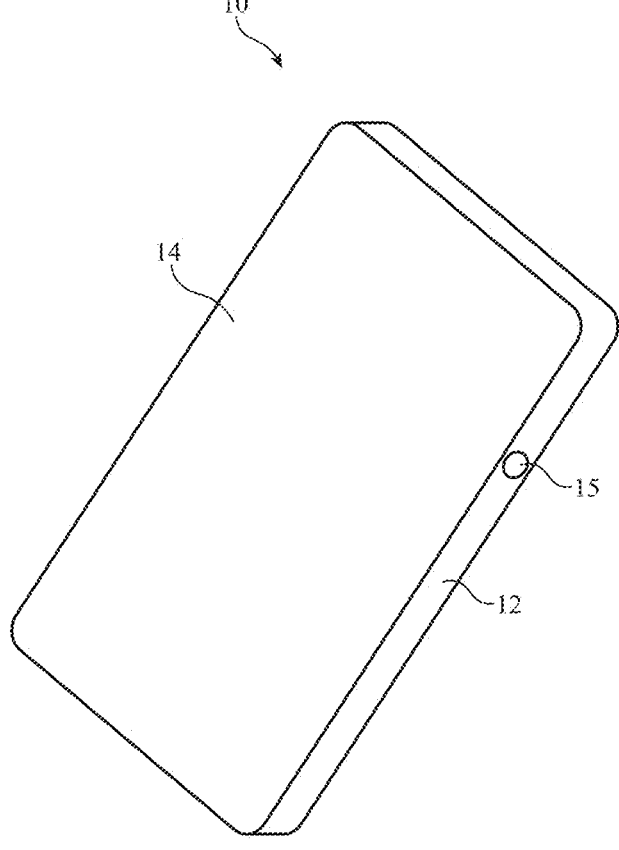
FIG. 2 is a drawing of an illustrative portable device in accordance with various embodiments.

In general, any suitable electronic devices may include these sensors. As shown in FIG. 1, a wearable electronic device 10, which may be a wristwatch device, may have a housing 12, a display 14, and a strap 16. The wristwatch may attach to a user's wrist via strap 16. One or more temperature sensors may be incorporated into housing 12. For example, housing 12 may have an opening or cavity 15. A component, such as a speaker, microphone, pressure sensor, or other sensor, may be formed within opening or cavity 15. In some embodiments, opening or cavity 15 may be covered by a mesh, grille, or other covering that allows air to pass through unimpeded. Another illustrative device that may include one or more temperature sensors is shown in FIG. 2. As shown in FIG. 2, a portable device 10, which may be a cellular telephone, a tablet computer, or other portable device, for example, has housing 12 and display 14. One or more components may be incorporated into housing 12 within opening or cavity 15.

Although opening or cavity 15 is shown on a sidewall of housing 12 in FIGS. 1 and 2 (i.e., between a front face of housing 12 that has display 14 and an opposing rear face of housing 12), this is merely illustrative. In general, cavities or openings may be formed anywhere in an electronic device, along with components (e.g., microphones, speakers, and/or sensors), such as on a front face of device 10 (with display 14) and/or on a rear face of device 10 (opposite display 14). Each of these cavities/openings may be covered with a mesh or grille, if desired.

Although FIGS. 1 and 2 show electronic device 10 shown as a wristwatch device and/or a cellular telephone device, these examples are merely illustrative. In general, electronic device 10 may be any desired device, such as a media player, or other handheld or portable electronic device, a wristband device, a pendant device, a headphone, a speaker, a smart speaker, an ear bud or earpiece device, a head-mounted device such as glasses, goggles, a helmet, or other equipment worn on a user's head, or other wearable or miniature device, a navigation device, or other accessory, and/or equipment that implements the functionality of two or more of these devices. Illustrative configurations in which electronic device 10 is a portable electronic device such as a cellular telephone, wristwatch, or portable computer may sometimes be described herein as an example. Regardless of the form factor of device 10, an illustrative schematic diagram of device 10 is shown in FIG. 3.

Figure 3:
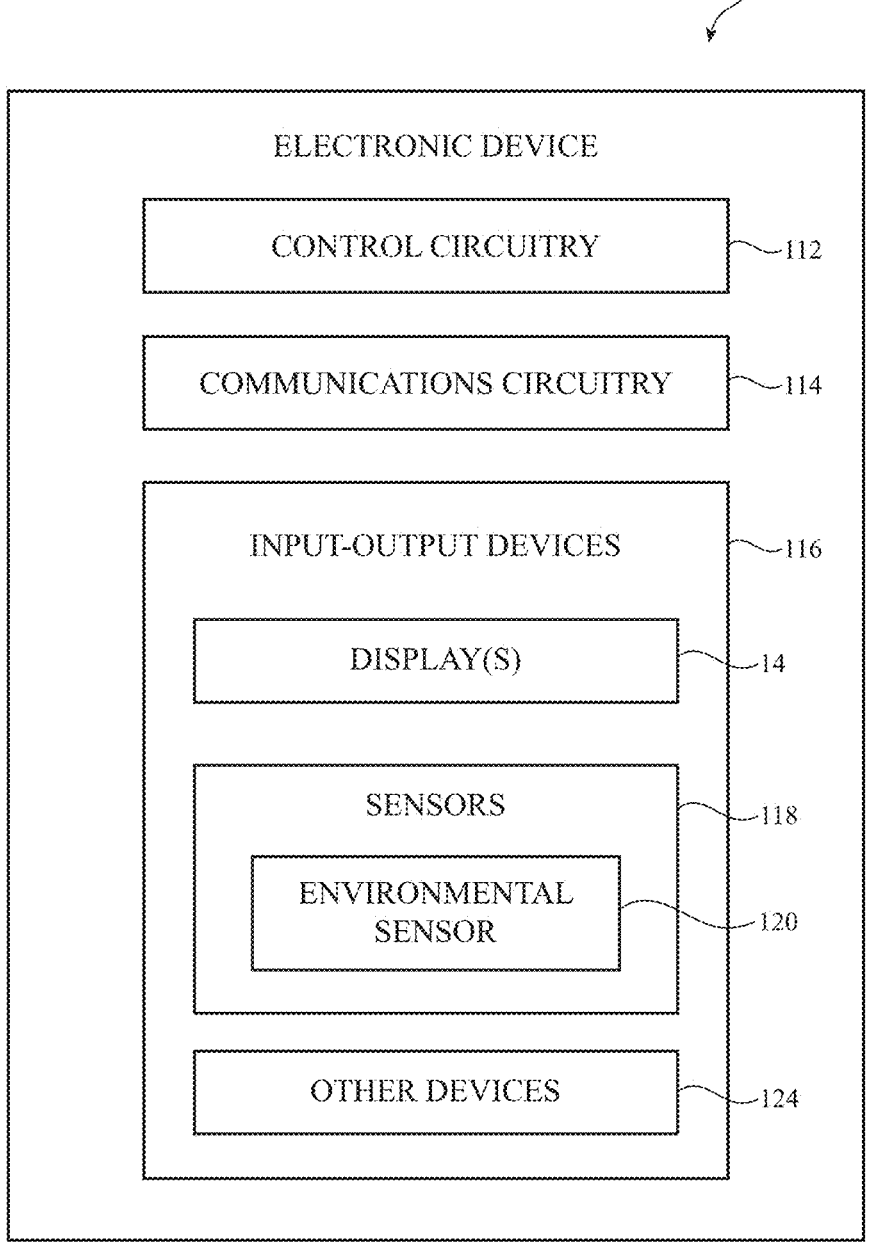
FIG. 3 is a diagram of an illustrative electronic device in accordance with various embodiments.

As shown in FIG. 3, electronic devices such as electronic device 10 may have control circuitry 112. Control circuitry 112 may include storage and processing circuitry for controlling the operation of device 10. Circuitry 112 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 112 may be based on one or more microprocessors, microcontrollers, digital signal processors, baseband processors, power management units, audio chips, graphics processing units, application specific integrated circuits, and other integrated circuits. Software code may be stored on storage in circuitry 112 and run on processing circuitry in circuitry 112 to implement control operations for device 10 (e.g., data gathering operations, operations involving the adjustment of the components of device 10 using control signals, etc.).

Electronic device 10 may include communications circuitry 114, which may include wired and/or wireless communications circuitry. For example, electronic device 10 may include radio-frequency transceiver circuitry, such as cellular telephone transceiver circuitry, wireless local area network transceiver circuitry (e.g., WiFi® circuitry), short-range radio-frequency transceiver circuitry that communicates over short distances using ultra high frequency radio waves (e.g., Bluetooth® circuitry operating at 2.4 GHz or other short-range transceiver circuitry), millimeter wave transceiver circuitry, and/or other wireless communications circuitry.

Device 10 may include input-output devices 116. Input-output devices 116 may be used to allow a user to provide device 10 with user input. Input-output devices 116 may also be used to gather information on the environment in which device 10 is operating. Output components in devices 116 may allow device 10 to provide a user with output and may be used to communicate with external electrical equipment.

Input-output devices 116 may include one or more optional displays such as displays 14. Displays 14 may be organic light-emitting diode displays or other displays with light-emitting diodes, liquid crystal displays, microLED displays, or other displays. Displays 14 may be touch sensitive (e.g., displays 14 may include two-dimensional touch sensors for capturing touch input from a user) and/or displays 14 may be insensitive to touch.

Input-output devices 116 may include sensors 118. Sensors 118 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light), binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data, cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors (e.g., a magnetometer), audio sensors (microphones), ambient light sensors, microphones for gathering voice commands and other audio input, sensors that are configured to gather information on motion, position, and/or orientation (e.g., accelerometers, gyroscopes, pressure sensors, compasses, and/or inertial measurement units that include all of these sensors or a subset of one or two of these sensors), health sensors that measure various biometric information (e.g., heartrate sensors, such as a photoplethysmography sensor), electrocardiogram sensors, and perspiration sensors) and/or other sensors.

Sensors 118 may also include one or more environmental sensors 120. Environmental sensor 120 may be, for example, a hot film anemometer formed from a metal film on a device housing, such as housing 12, or may be a hot wire anemometer formed from a metal strand incorporated into a mesh, such as a mesh that covers an opening/cavity in device 10 (e.g., cavity/opening 15). Circuitry in device 10, such as control circuitry 112, may heat the metal film or strand to a known temperature, and determine ambient air speed based on the decay time for the temperature of the metal to return to equilibrium (e.g., the equilibrium temperature of the metal prior to being heated), or the time for the temperature of the metal to reach another desired temperature. If it is desired to measure ambient temperature, a reference resistor may be used, and the decay of the temperature of the metal may be compared to the decay of the reference resistor. Alternatively or additionally, the layer of metal may include multiple metals, or multiple strands of different metals may be incorporated into the mesh, and Seebeck voltages across junctions between the different metals may indicate the heat flux across the device housing. If desired, the layer or strands of metal may be used to determine solar radiation and/or the presence of water. In this way, the layer or strands of metal may be used as an anemometer, thermometer, bolometer, water sensor, and/or heat flux sensor.

If desired, input-output devices 116 may include other devices 124 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

To incorporate environmental sensor 120 into an electronic device, it may be desirable to use a layer of metal coupled to a housing wall or other surface of the device. An illustrative arrangement is shown in FIG. 4.

Figure 4:
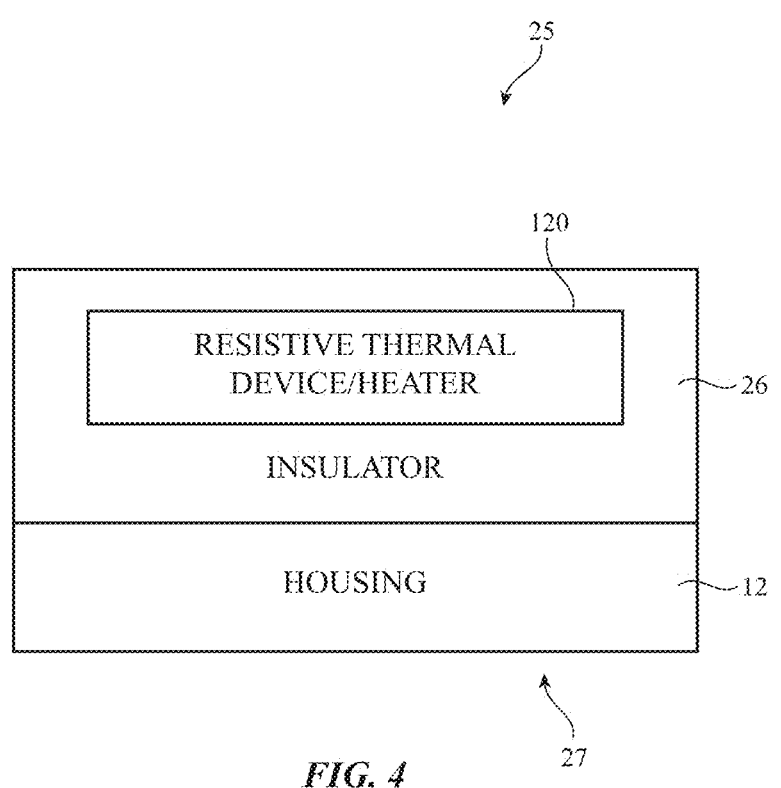
FIG. 4 is a side view of an illustrative hot film anemometer on a device housing in accordance with various embodiments.

As shown in FIG. 4, resistive thermal device 120 may be surrounded by insulator 26 and applied to housing 12 in sensor stack 25. Resistive thermal device 120 may be a film, sheet, layer, or other deposition of metal (or other conductive material). For example, resistive thermal device 120 may be formed from platinum, nickel, copper, or other desired conductive material. In some embodiments, resistive thermal device 120 may be a thin layer of metal that is formed on housing 12 using laser direct structuring, physical vapor deposition, or other desired method. Resistive thermal device 120 may also be a heater, as indicated in FIG. 4 (e.g., current/voltage may be provided to resistive thermal device 120 to heat resistive thermal device 120). Alternatively, resistive thermal device 120 may be heated by a heater that is separate from resistive thermal device 120.

Resistive thermal device 120 and insulator 26 may be formed on an interior of housing 12 (i.e., region 25 may be the interior of the electronic device, while region 27 is the exterior of the electronic device). Alternatively, resistive thermal device 120 and insulator 26 may be formed on an exterior of housing 12 (i.e., region 25 may be the exterior of the electronic device, while region 27 is the interior of the electronic device).

Insulator 26 may be formed from any desired insulating material. For example, insulator 26 may be formed from rubber, plastic or other polymer, and/or glass. Although insulator 26 is shown as surrounding resistive thermal device 120, this is merely illustrative. In general, insulator 26 may be formed between housing 12 and resistive thermal device 120 if necessary (e.g., if housing 12 is formed from a conductive material, such as metal). Depending on the arrangement of the electronic device and resistive thermal device 120, such as the position of other components relative to resistive thermal device 120, insulator 26 may not be present at the top of resistive thermal device 120 (i.e., between resistive thermal device 120 and region 25). In some embodiments, housing 12 may be formed from a material, such as plastic, and insulator 26, may not be present at the bottom of resistive thermal device 120. In these embodiments, resistive thermal device 120 may be formed directly on housing 12, if desired.

Due to the optional presence of insulator 26, resistive thermal device 120 may be applied to metal portions, glass portions, plastic portions, or any other desired portions of housing 12. Although FIG. 4 shows insulator 26 and resistive thermal device 120 formed on a planar portion of housing 12, this is merely illustrative. Insulator 26 and/or resistive thermal device 120 may be formed on a curved portion of housing 12, if desired.

Regardless of the arrangement of resistive thermal device 120, device 120 may be used as an anemometer to measure ambient air speed (i.e., the velocity of air outside of the electronic device to which resistive thermal device 120 is mounted). A flowchart of illustrative steps for using resistive thermal device 120 as an anemometer is shown in FIG. 5.

Figure 5:
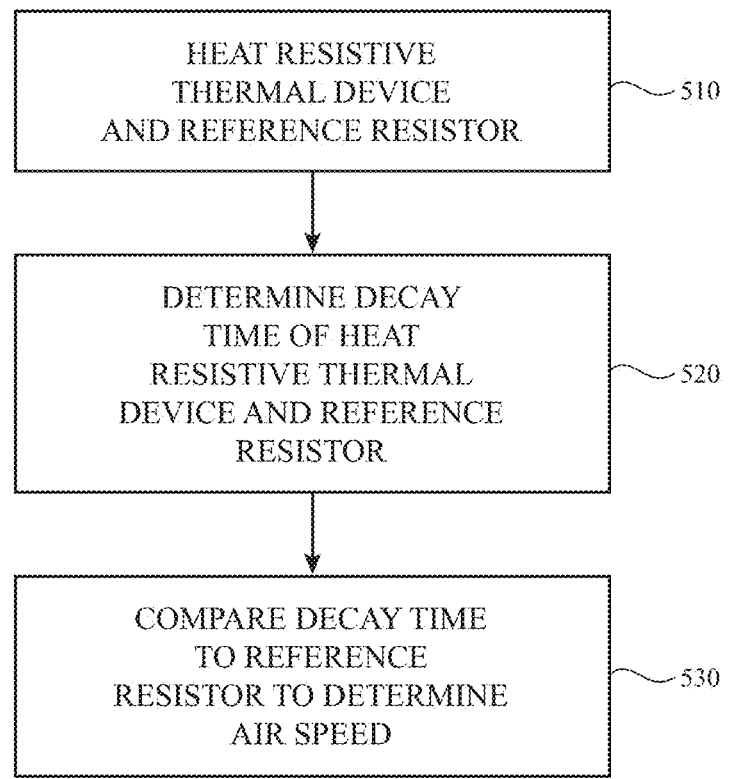
FIG. 5 is a flowchart of illustrative steps used in operating a hot film or hot wire anemometer to measure air speed in accordance with various embodiments.

As shown in FIG. 5, at step 510, the resistive thermal device may be heated. A resistive thermal device, such as resistive thermal device 120 of FIG. 4, may have an integrated heater (e.g., circuitry may apply current/voltage directly to the resistive thermal device to heat the device) or may be heated by a separate heating device. If desired, a reference resistor may be heated simultaneously with resistive thermal device 120. For example, the reference resistor may be arranged with resistive thermal device 120 in a Wheatstone bridge and may have a known resistance. If desired, the reference resistor may be within device 10 (e.g., within housing 12) so that it is not subject to convection (e.g., a change in heat caused by external wind speed/air speed). In some embodiments, circuitry within the electronic device, such as control circuitry 112 of device 10, may provide current to the resistive thermal device and/or reference resistor, or otherwise use heaters to heat the components.

Resistive thermal device 120 may be heated in any desired manner. In some embodiments, resistive thermal device 120 may be heated linearly by a desired voltage (or heated by a separate heater by a desired amount). Alternatively, resistive thermal device 120 may be heated with an alternating current of sinusoidal frequency using the lock-in amplifier method. The lock-in amplifier method may reduce interference from noise in the system and/or external noise.

After resistive thermal device 120 has reached equilibrium at a desired temperature, at step 520, control circuitry may determine the decay time of resistive thermal device 120 to return to the original temperature (i.e., the time required for resistive thermal device 120 to return to the temperature before heating), or to cool to another desired temperature. For example, a temperature equilibrium may include a temperature change threshold per unit of time, such as less than 1° C./s, less than 1.25° C./s, less than 2.5° C./s, less than 10° C./s, or another desired threshold. At the same time, the control circuitry may determine the decay time of the reference resistor to return to the original temperature or other desired temperature.

At step 530, the control circuitry may compare the decay time of the heat resistive thermal device to the decay time of the reference resistor. In particular, because the reference resistor is exposed to the ambient air by being on the outside of housing 12 or on the inside surface of housing 12, the reference resistor may have a slower decay time than the heat resistive thermal device, which is impacted by the movement of ambient air. For example, if the air speed is high, then the heat resistive thermal device may cool down much faster than the reference resistor. In this way, the decay time of the heat resistive thermal device may inversely correlate with the air speed. Therefore, based on the decay times of the reference resistor and the heat resistive thermal device, the control circuitry may calculate the air speed/wind speed of the ambient air.

Although FIG. 5 describes the use of a reference resistor, this is merely illustrative. In particular, a reference resistor may be useful when the ambient temperature is not known. However, if the electronic device has a separate sensor to measure ambient temperature or can obtain the ambient temperature from an external device, the reference resistor may be omitted, if desired. For example, the control circuitry may store known decay rates for the resistive thermal device at different ambient temperatures and wind speeds, and may correlate the measured decay rate to the wind speed based on the received ambient temperature. Moreover, if a reference resistor is incorporated into the device, the reference resistor may be used to calculate ambient temperature, such as by using known correlations between ambient temperature and the decay time of the reference resistor.

Instead of, or in addition to, using resistive thermal device 120 to measure wind speed and/or temperature, resistive thermal device 120 may be used as a bolometer to measure solar radiation, if desired. Thermal isolation from the environmental may improve the performance of resistive thermal device 120 as a bolometer. For example, vacuum cavities, transparent polymers, or other desired thermal insulators may be used between resistive thermal device 120 and the environment. In some examples, a portion of resistive thermal device 120 may be coated with a transparent insulator and another portion of resistive thermal device 120 may be uncoated (or portions of resistive thermal device 120 may otherwise have different optical absorption and/or different thermal resistances to air). A difference between the coated and uncoated sections of resistive thermal device 120 may allow solar radiation to be measured.

Alternatively or additionally, a reference wire (e.g., a separate component from resistive thermal device 120 with a different optical absorption property and/or different thermal resistance to air) may be used and compared to determine the solar radiation. In some examples, the reference wire may be shielded from solar radiation by being in an internal region of the device.

Figure 6:
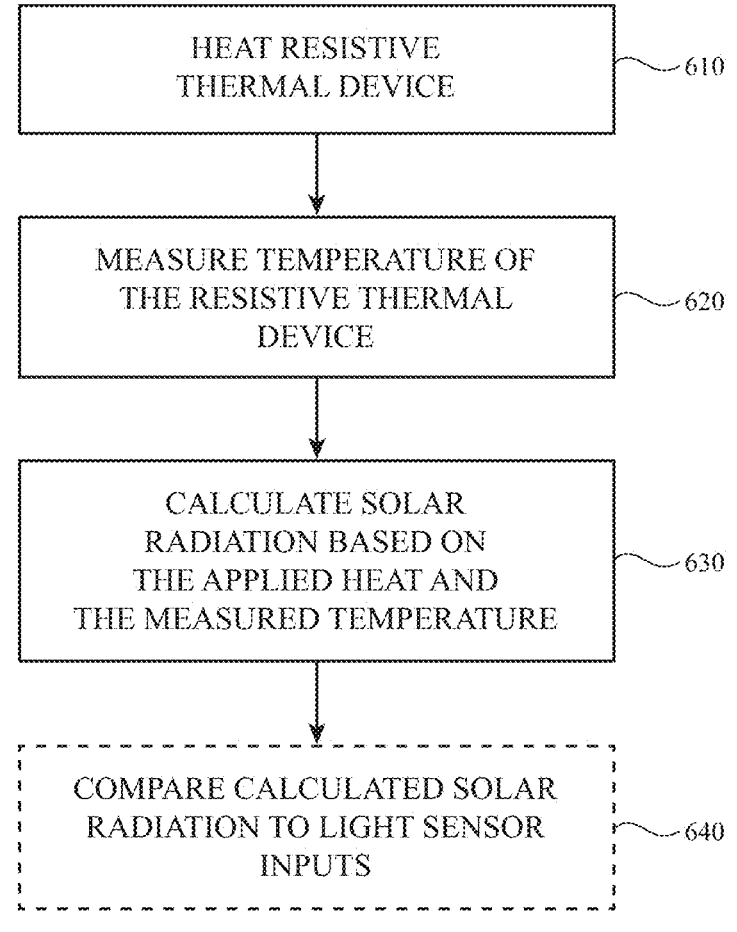
FIG. 6 is a flowchart of illustrative steps used in operating a bolometer in accordance with an embodiment.

A flowchart of illustrative steps that may be used to measure solar radiation with resistive thermal device 120 (such as a resistive thermal device 120 with a first coated portion and a second uncoated portion) is shown in FIG. 6.

As shown in FIG. 6, at step 610, the resistive thermal device may be heated. A resistive thermal device, such as resistive thermal device 120 of FIG. 4, may have an integrated heater (e.g., circuitry may apply current directly to the resistive thermal device to heat the device) or may be heated by a separate heating device. If desired, a reference resistor may be heated simultaneously with resistive thermal device 120. For example, the reference resistor may be arranged with resistive thermal device 120 in a Wheatstone bridge and may have a known resistance. If desired, the reference resistor may be within device 10 (e.g., within housing 12). In some embodiments, circuitry within the electronic device, such as control circuitry 112 of device 10, may provide current to the resistive thermal device and/or reference resistor, or otherwise use heaters to heat the components.

Resistive thermal device 120 may be heated in any desired manner. In some embodiments, resistive thermal device 120 may be heated linearly by a desired amount. Alternatively, resistive thermal device 120 may be heated with an alternating current of sinusoidal frequency using the lock-in amplifier method. The lock-in amplifier method may reduce interference from noise in the system and/or external noise.

Thermal isolation from the environmental may improve the performance of resistive thermal device 120 as a bolometer. For example, vacuum cavities, transparent polymers, or other desired thermal insulators may be used between resistive thermal device 120 and the environment. In some examples, a portion of resistive thermal device 120 may be coated with a transparent insulator and another portion of resistive thermal device 120 may be uncoated (or portions of resistive thermal device 120 may otherwise have different optical absorption and/or different thermal resistances to air).

At step 620, after heating the resistive thermal device by a desired amount (e.g., applying a desired amount of voltage to the resistive thermal device, or heating the resistive thermal device with a desired amount of heat using a separate heater) the temperature of the resistive thermal device may be measured. For example, the temperature of the insulated portion of resistive thermal device 120 may be compared to the uncoated portion of resistive thermal device 120.

At step 630, an amount of solar radiation may be calculated based on the amount of heat/voltage applied to the resistive heating device and the measured temperature. In particular, if the resistive heating device is hotter than an expected temperature (i.e., the initial temperature of the resistive heating device modified by the amount of heat/voltage applied to the resistive heating device), then it may be determined that the difference is due to solar radiation. Because one portion of resistive thermal device 120 is insulated, while another portion is uncoated, the uncoated portion may be heated by solar radiation, while the insulated portion is not (or is heated by a lower amount). Therefore, the temperatures of these portions may be compared to determine the solar radiation.

Alternatively or additionally, a reference wire (e.g., a separate component from the resistive heating device with a different optical absorption property and/or different thermal resistance to air) may be used and compared to determine the solar radiation. In some examples, the reference wire may be shielded from solar radiation by being in an internal region of the device.

Although steps 620 and 630 are described as being related to measured temperatures, if a reference resistor is optionally used at step 610, then the temperature of the resistive thermal device may not be measured. Instead, the response of the resistive thermal device may be compared to the response of the reference resistor by the control circuitry to determine the difference between the expected response and the response with solar radiation. The difference may be calculated and attributed to the amount of solar radiation.

At optional step 640, the control circuitry may verify the solar radiation calculation by comparing it to inputs from light sensors within the electronic device. In particular, it may be desirable to ensure that the extra heat on the resistive thermal device is from solar radiation, and checking the light sensors may inform the control circuitry whether it is from solar radiation (i.e., ambient light incident on the device) or another source.

FIGS. 5 and 6 discuss methods of operating a resistive thermal device, such as resistive thermal device 120, as an anemometer, thermometer (e.g., by using a reference resistor and comparing a resistive thermal device response to a response of the reference resistor), and bolometer. In addition to these functions, it may be desirable to operate a resistive thermal device as a heat flux sensor. An example of an illustrative resistive thermal device that may be operated as a heat flux sensor is shown in FIG. 7.

Figure 7:
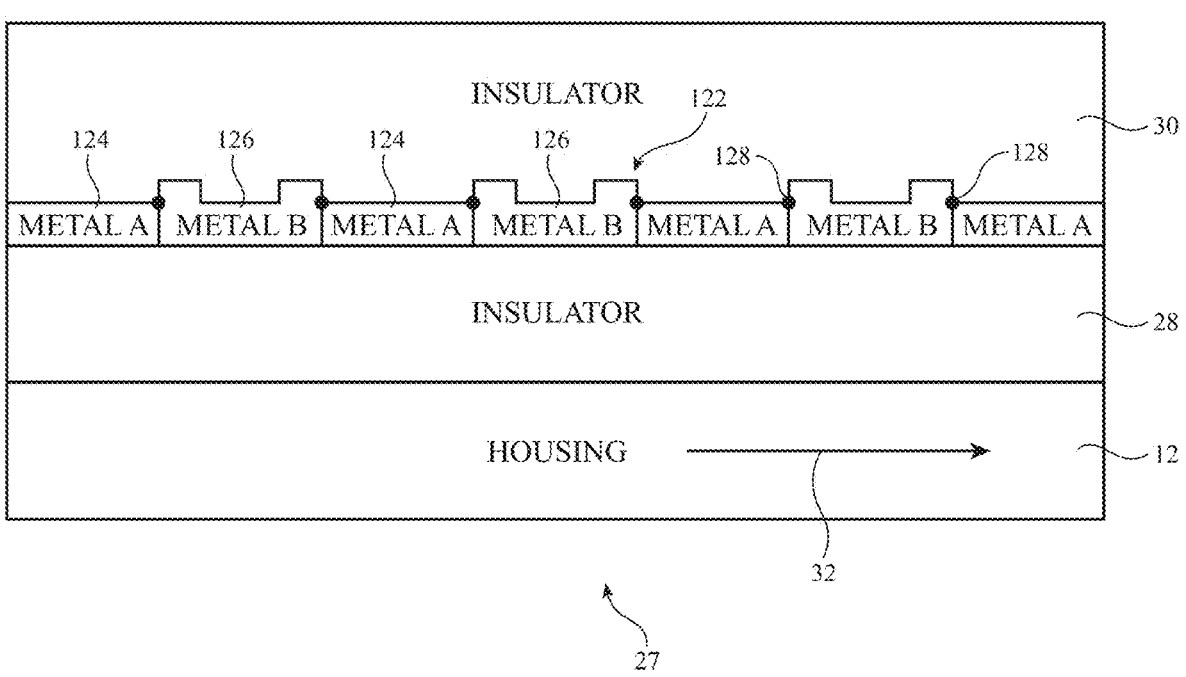
FIG. 7 is a side view of an illustrative flux sensor on a device housing in accordance with various embodiments.

As shown in FIG. 7, a resistive thermal device, such as resistive thermal device 122, may have insulator layers 28 and 30 on bottom and top surfaces of device 122, respectively, and applied to housing 12. Resistive thermal device 122 may be a film, sheet, layer, or other deposition of metal (or other conductive material). As shown in FIG. 7, resistive thermal device 122 may include two different metal layers that are coupled at junctions 128. In particular, resistive thermal device 122 may include portions 124 that are formed from metal A and portions 126 that are formed from metal B. As shown in FIG. 7, metal B may fill openings between metal A. In general, however, metal B may partially obstruct openings between metal A, if desired.

Metals A and B may be, for example, different metals selected from platinum, nickel, copper, or other desired conductive material. Although FIG. 7 shows two metal portions, this is merely illustrative. More than two metal portions may be incorporated into resistive thermal device 122, if desired. Resistive thermal device 122 may be similar to resistive thermal device 120, except for the use of multiple metals. Resistive thermal device 122 may be incorporated into an electronic device, such as electronic device 10, in the same manner as resistive thermal device 120.

Due to the presence of two different metals in resistive thermal device 122, resistive thermal device 122 may be used as a heat flux sensor. In particular, control circuitry, such as control circuitry 112, may apply a voltage to first and second metal portions 124 and 126. The circuitry may then measure Seebeck voltages at junctions 128 between the first and second metal portions 124 and 126. Because junctions 128 are between two metals with different conductivities, the measured Seebeck voltages may be correlated with the heat flux through the layer, and the control circuitry may determine the heat flux from the measured Seebeck voltages. As shown in FIG. 7, for example, there may be a heat flux in direction 32 within housing 12 that may be measured in this manner.

In some embodiments, resistive thermal device 122 (i.e., portions 124 and 126) may be a thin layer of metal that is formed on housing 12 using laser direct structuring, physical vapor deposition, or other desired method. Resistive thermal device 122 may also be a heater, or otherwise include heating elements. Alternatively, resistive thermal device 122 may be heated by a heater that is separate from resistive thermal device 122.

Resistive thermal device 122 and insulators 28 and 30 may be formed on an interior of housing 12 (i.e., region 25 may be the interior of the electronic device, while region 27 is the exterior of the electronic device). Alternatively, resistive thermal device 122 and insulators 28 and 30 may be formed on an exterior of housing 12 (i.e., region 25 may be the exterior of the electronic device, while region 27 is the interior of the electronic device).

Insulators 28 and 30 may be formed from any desired insulating material. For example, insulators 28 and 30 may be formed from rubber, plastic or other polymer, glass, air, gas, and/or vacuum. Although insulators 28 and 30 are shown on both sides of resistive heating element 122, this is merely illustrative. In general, insulators 28 and 30 may be formed between housing 12 and resistive thermal device 122 if necessary (e.g., if housing 12 is formed from a conductive material, such as metal). Depending on the arrangement of the electronic device and resistive thermal device 122, such as the position of other components relative to resistive thermal device 122, it may be unnecessary to include insulator 30 on top of resistive thermal device 122 (i.e., between resistive thermal device 122 and region 25). In some embodiments, housing 12 may be formed from a material, such as plastic, that does not require the use of insulator 28. In these embodiments, resistive thermal device 122 may be formed directly on housing 12, if desired.

Moreover, although insulators 28 and 30 are shown on the bottom and top of resistive heating element 122, respectively, insulators 28 and 30 may be portions of a single insulator that surrounds heating element 122, or may be two separate insulators that together surround heating element 122, if desired.

Due to the optional presence of insulators 28 and 30, resistive thermal device 122 may be applied to metal portions, glass portions, plastic portions, or any other desired portions of housing 12. Although FIG. 7 shows insulators 28 and 30, and resistive thermal device 122 formed on a planar portion of housing 12, this is merely illustrative. Insulators

28 and 30, and/or resistive thermal device 122 may be formed on a curved portion of housing 12, if desired.

Regardless of the arrangement of resistive thermal device 122, device 122 may be used as an anemometer to measure ambient air speed (i.e., the velocity of air outside of the electronic device to which resistive thermal device 122 is mounted), a thermometer, and/or a bolometer, as described above in connection with FIGS. 5 and 6. Alternatively or additionally, resistive thermal device may be used to measure heat flux. A flowchart of illustrative steps for using resistive thermal device 122 as a heat flux sensor is shown in FIG. 8.

Figure 8:
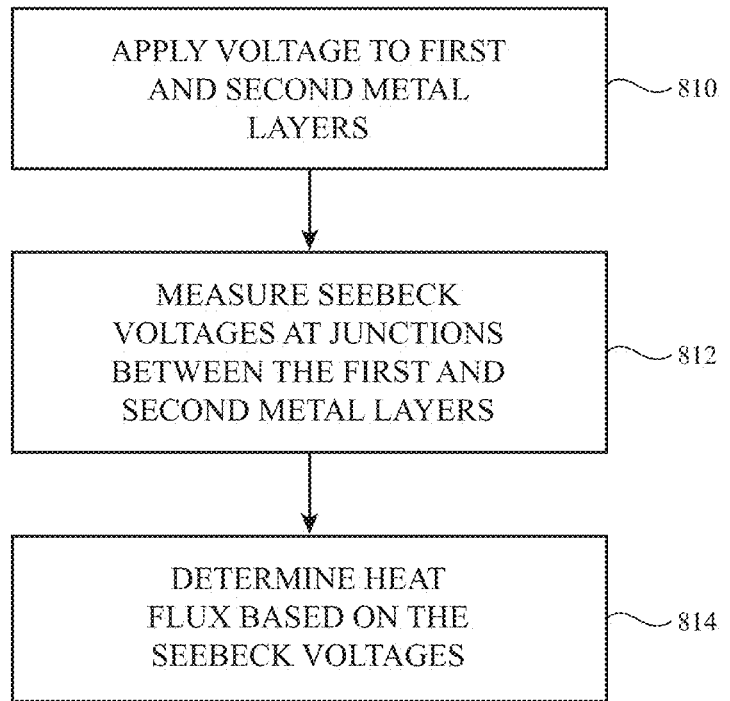
FIG. 8 is a flowchart of illustrative steps used in operating a heat flux sensor in accordance with an embodiment.

As shown in FIG. 8, at step 810, control circuitry, such as control circuitry 112, may apply a voltage to first and second metal layers. The first and second metal layers may be, for example, first metal portion 124 and second metal portion 126 of FIG. 7, respectively. The first and second metal layers may be formed from different metals selected from platinum, nickel, copper, or other desired conductive material. Although FIG. 8 is described as incorporating two metal layers of different metals, this is merely illustrative. More than two metal layers may be used, if desired.

At step 812, the control circuitry may measure Seebeck voltages at junctions between the first and second metal layers. The Seebeck voltages are generated by the junction, so outside excitation is not needed. The Seebeck voltages may be measured in an open circuit configuration with a voltmeter, such as a high-impedance voltmeter, for example.

At step 814, the control circuitry may determine the heat flux through the housing (or other layer on which the metal layers are deposited) based on the Seebeck voltages. In particular, because the junctions are between two metals with different conductivities, the measured Seebeck voltages may be correlated with the heat flux through the layer, and the control circuitry may determine the heat flux from the measured Seebeck voltages.

If desired, the control circuitry can drive a current through the first and second metal layers, and the voltage can be measured. This voltage can then be subtracted from the Seebeck voltages, and the resulting voltage may be proportional to the temperature. In this way, resistive thermal device 122 may be used as a temperature sensor.

Although FIGS. 4-8 have shown and described a resistive thermal device that can be used as an anemometer, thermometer, bolometer, and/or heat flux sensor applied to a housing surface, this is merely illustrative. In general, a resistive thermal device of this type may be applied to any desired surface, whether on the interior or exterior of an electronic device. In some embodiments, it may be desirable to incorporate the resistive thermal device into a preexisting part of the electronic device. An illustrative example of a resistive thermal device incorporated into a mesh is shown in FIG. 9.

Figure 9:
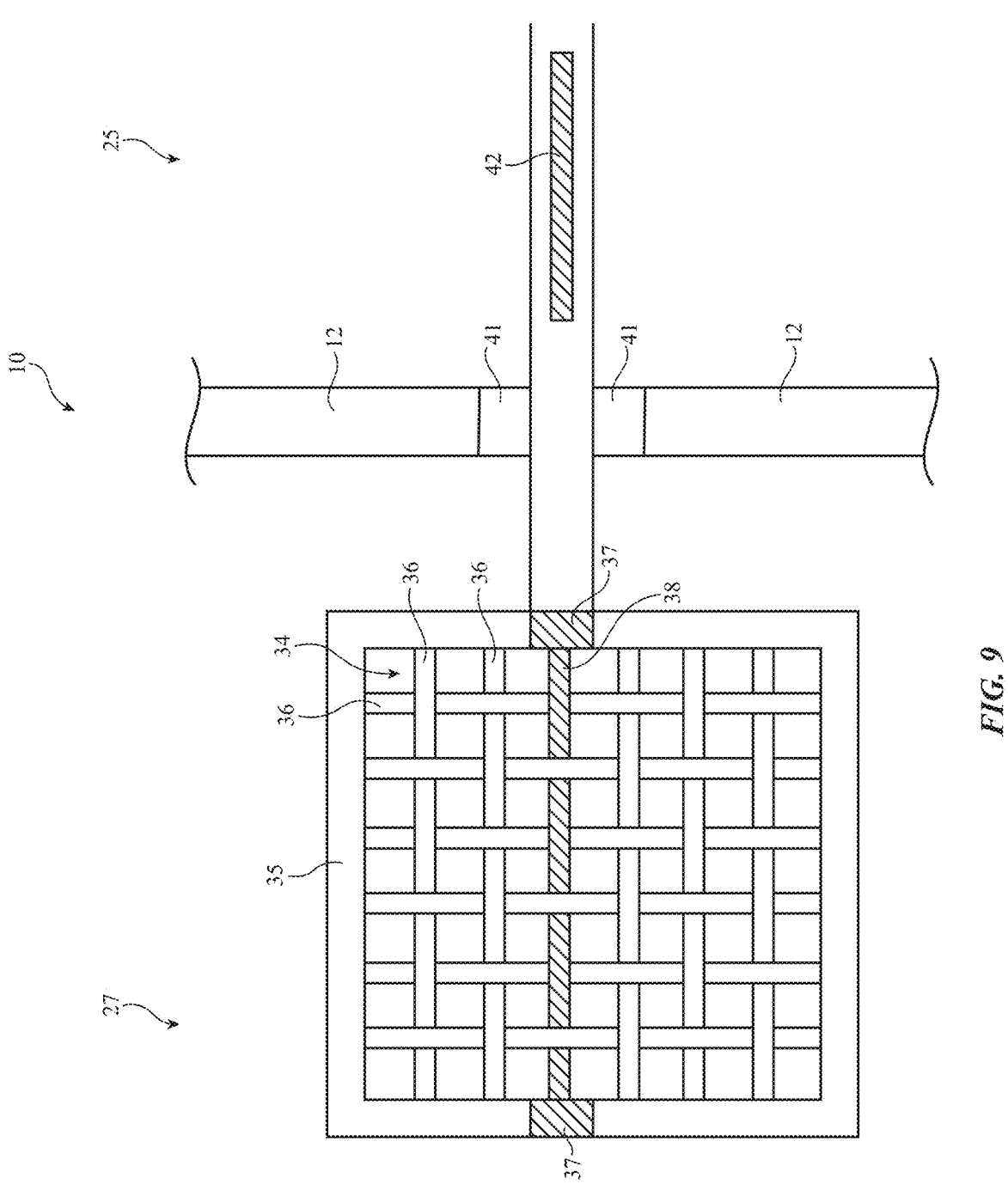
FIG. 9 is a top view of an illustrative hot wire anemometer in a mesh coupled to the interior of a device through a housing wall in accordance with various embodiments.

As shown in FIG. 9, mesh 34 may be applied over flex 35 using attachment 37. Attachment 37 may be, for example, solder, welding, adhesive, conductive adhesive, pressure sensitive adhesive, or other desired attachment. Mesh 34 may cover a component in device 10, such as a microphone, a speaker, a sensor, such as a pressure sensor, or any other desired component (such as a component in opening 15 of FIGS. 1 and 2). In some embodiments, however, mesh 34 may be formed on the outside of an electronic device without overlapping additional components. If desired, mesh 34 may be transparent to sound to allow underlying components to emit or receive sound through mesh 34.

Mesh 34 may be formed from strands 36. Strands 36 may be polymer strands, textile strands, fabric strands, metal strands, or other desired strands. Strands 36 may be woven or otherwise attached to one another to form mesh 34.

At least one of the strands in mesh 34 may be resistive thermal device wire 38. In the example of FIG. 9, resistive thermal device wire 38 may be a single wire in mesh 34. Resistive thermal device wire 38 may be formed from platinum, nickel, copper, or any other desired conductive material. Resistive thermal device wire 38 may also be a heater, or be heated by a separate heating element.

Mesh 34 may be attached to exterior 27 of housing 12. Resistive thermal device wire 38 may be coupled to circuitry, such as control circuitry 112, in device 10 through an opening in housing 12. To prevent water from entering housing 12 through the opening, gasket 41 may be used. In particular, gasket 41 may allow resistive thermal device wire 38 to pass through housing 12 to internal circuitry, while retaining water resistance of device 10. Although gasket 41 is described as a gasket, this is merely illustrative. In general, any waterproofing technique may be used to allow resistive thermal device wire 38 to be coupled to internal circuitry without sacrificing the water resistance of device 10.

Reference resistive thermal device 42 may be formed in an interior of device 10. In particular, reference resistive thermal device 42 may not be subject to convection (e.g., a change in heat caused by external wind speed/air speed) and may therefore serve as a reference resistor in determining the speed based on the change in temperature of resistive thermal device wire 38.

In operation, resistive thermal device wire 38 may be used similarly to resistive thermal device 120 of FIG. 3. In particular, resistive thermal device wire 38 may be used as an anemometer, thermometer, and/or bolometer, as described in connection with FIGS. 4 and 5. Control circuitry in device 10 may heat resistive thermal device wire 38 and compare the decay time of the temperature of resistive thermal device wire 38 with the decay time of reference resistive thermal device 42 to determine the air speed (as described in FIG. 4). Similarly, control circuitry in device 10 may heat resistive thermal device wire 38 and calculate solar radiation based on the applied heat and the final temperature of resistive thermal device wire 38, and may compare the calculated solar radiation to light sensors within device 10, if desired (as described in FIG. 5). In this way, a resistive thermal device wire may be used in a mesh in device 10 as an anemometer, thermometer, and/or bolometer.

Although FIG. 9 shows a single resistive thermal device wire 38 in mesh 34, this is merely illustrative. In general, any desired number of resistive thermal device wires may be incorporated into mesh 34. Examples of illustrative meshes that have more than one resistive thermal device wire (and that may be used in the context of FIG. 9) are shown in FIGS. 10A-C.

Figures 10A, 10B, 10C:
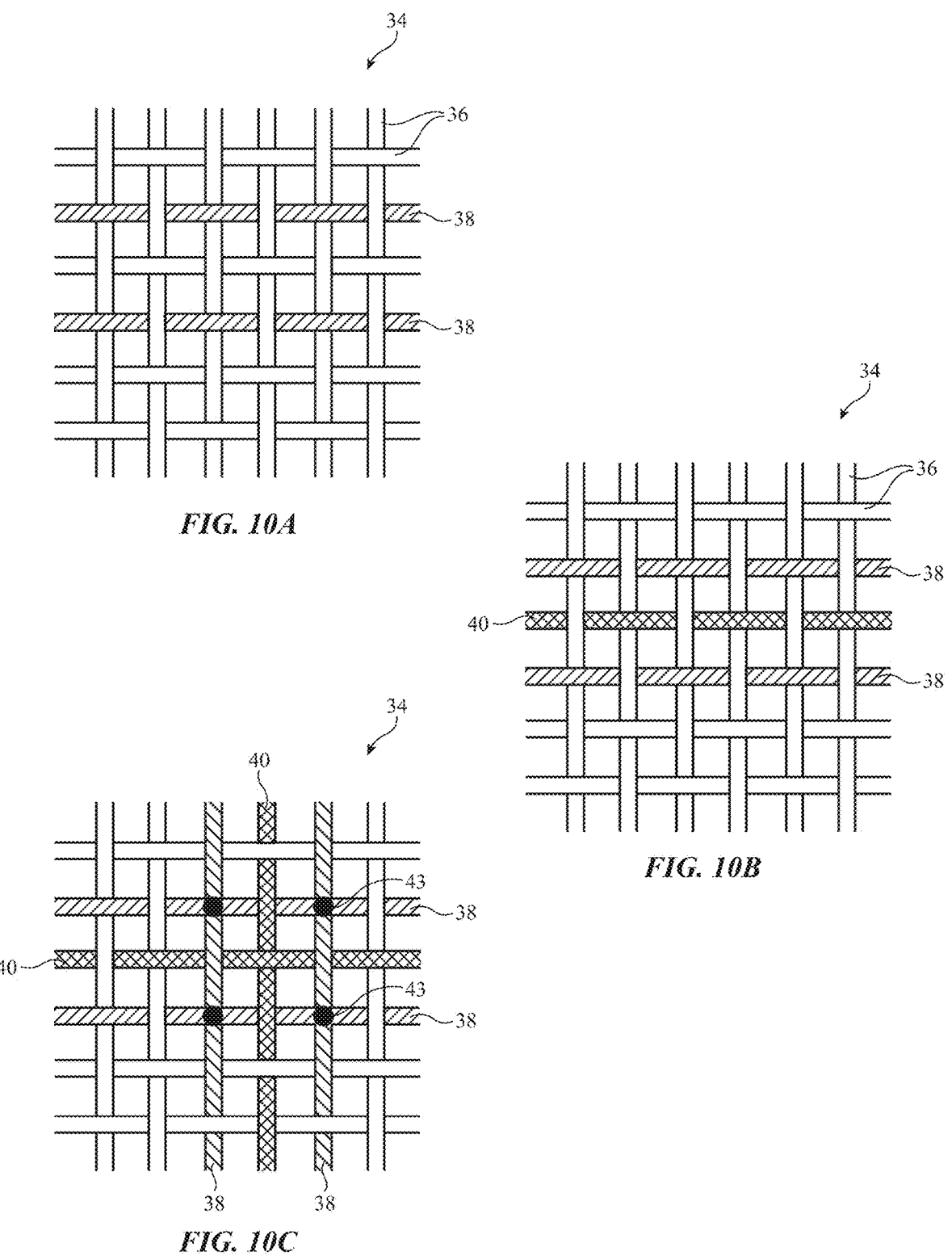
FIGS. 10A-10C are top views of illustrative meshes with hot wire anemometers formed from strands of the meshes in accordance with various embodiments.

As shown in FIG. 10A, mesh 34 may include two resistive thermal device wires 38 that are parallel to one another. As in the embodiment of FIG. 9, the two resistive thermal device wires 38 of FIG. 10A may be woven or otherwise interspersed with strands 36 to form mesh 34. The two resistive thermal device wires 38 may two resistors within a Wheatstone bridge (along with reference device 42 of FIG. 9), allowing for more accurate environmental measurements. Additionally, using two resistive thermal device wires 38 may allow for the determination of wind direction (e.g., because one of the wires 38 may be cooled more than the other wire 38 and therefore be in the windward direction), if desired.

In FIGS. 9 and 10A, resistive thermal device wires 38 have been described as being capable of heating (e.g., in response to voltage/current applied to wires 38). However, a separate heating source, such as a heating wire, may be used to heat resistive thermal device wires 38, if desired. As shown in FIG. 10B, resistive thermal device wires 38 may be incorporated in parallel, with intervening heating wire 40, amongst strands 36 to form mesh 34. It may be desirable to weave resistive thermal device wires 38 and heating wire 40 to prevent contact between wires 38 and wire 40. Alternatively, an insulator may be incorporated between heating wire 40 and wires 38 in locations where they may come into contact.

Heating wire 40 may be formed from any desired metal or other conductive material. In operation, heating wire 40 may be heated by circuitry within device 10, such as control circuitry 112, and may heat resistive thermal device wires 38. The control circuitry may then monitor the decay of the heat of resistive thermal device wires 38 to make environmental measurements. As in the example of FIG. 10A, having an additional resistive thermal device wire 38 may allow for more accurate measurements, along with the determination of wind direction, if desired. Although FIG. 10B shows heating wire 40 heating two resistive thermal device wires 38, this is merely illustrative. In general, a heating wire in a mesh may be used to heat any desired number of resistive thermal device wires.

The embodiments of FIGS. 10A and 10B include resistive thermal device wires that may be used as an anemometer, thermometer, and/or bolometer. If it is also desired to measure heat flux, one or more of the resistive thermal device wires may be coupled together at one or more junctions. An illustrative example of a mesh that has resistive thermal device wires coupled at multiple junctions is shown in FIG. 10C.

As shown in FIG. 10C, resistive thermal device wires 38 may be arranged perpendicularly to each other. In this way, there may be at least one junction 43 between resistive thermal device wires 38. Moreover, resistive thermal device wires 38 may include different metals from one another. In this way, control circuitry may measure the Seebeck voltage at the one or more junctions 43 to determine the heat flux across mesh 34 (as described in connection with FIG. 8).

Although not required, heating wires 40 may be interspersed with resistive thermal device wires 38 to heat resistive thermal device wires 38. If desired, however, resistive thermal device wires 38 may have self-heating capabilities (e.g., in response to voltage/current applied to wires 38), or resistive thermal device wires 38 may be heated by another heat source, such as a heat source inside of device 10.

Although four resistive thermal device wires 38 are shown in FIG. 10C, this is merely illustrative. In general, two wires, three wires, four wires, or more than four wires may be used in a mesh to form a heat flux sensor.

Additionally, the heat flux sensor of FIG. 10C may also be used as an anemometer, thermometer, and/or bolometer, as previously described. Thermal isolation from the environmental may improve the performance of resistive thermal device wires 38 as a bolometer. For example, vacuum cavities, transparent polymers, or other desired thermal insulators may be used between resistive thermal device wires 38 and the environment. In some examples, a portion of resistive thermal device wires 38 may be coated with a transparent insulator and another portion of resistive thermal device wires 38 may be uncoated (or portions of resistive thermal device wires 38 may otherwise have different optical absorption and/or different thermal resistances to air). A difference between the coated and uncoated sections of resistive thermal device wires 38 may allow solar radiation to be measured.

Alternatively or additionally, a reference wire (e.g., a separate component from resistive thermal device wires 38 with a different optical absorption property and/or different thermal resistance to air) may be used and compared to determine the solar radiation. In some examples, the reference wire may be shielded from solar radiation by being in an internal region of the device.

In some embodiments, a resistive thermal device, such as resistive thermal device 120, resistive thermal device 122, and/or one or more resistive thermal device wires 38 may be exposed to an exterior of an electronic device. For example, the resistive thermal device may be formed on an external surface of the device, or may be incorporated into a mesh that is exposed to the exterior of the device. In some cases, it may be desirable to use the exposed resistive thermal device(s) for water detection. In particular, control circuitry within an electronic device, such as control circuitry 112 in device 10, may measure the conductivity between or the capacitance between multiple electrodes (e.g., two resistive thermal device wires 38) or may measure changes in the heat capacity of one or more electrodes (e.g., resistive thermal device wire 38). Because the conductivity or capacitance between two electrodes that are separated by water will be different than when they are separated by air, the control circuitry may determine that water is present. Similarly, the heat capacity of an electrode that is in contact with water will change, so control circuitry can detect water by monitoring the heat capacity, if desired.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is illustrative and various modifications can be made to the described embodiments. The foregoing embodiments may be implemented individually or in any combination.

What is claimed is:

1. An electronic device, comprising:
a housing that includes a front face, an opposing rear face, and sidewalls between the front face and the rear face;
a display at the front face of the housing;
an insulator on at least one of the front face, the rear face, or at least one of the sidewalls of the housing; and
a resistive thermal device on the insulator.

2. The electronic device of claim 1, further comprising:
circuitry that provides a current to the resistive thermal device to heat the resistive thermal device from an original temperature to a desired temperature; and
control circuitry configured to calculate an air speed based on a decay time from the desired temperature to the original temperature.

3. The electronic device of claim 2, wherein the circuitry comprises a heating element configured to heat the resistive thermal device from the original temperature to the desired temperature.

4. The electronic device of claim 2, wherein the circuitry heats the resistive thermal device with an alternating current of sinusoidal frequency using a lock-in amplifier method.

5. The electronic device of claim 1, wherein the housing has an interior and an exterior, and the insulator is on the interior.

6. The electronic device of claim 1, wherein the housing has an interior and an exterior, and the insulator is on the exterior.

7. The electronic device of claim 1, wherein the resistive thermal device comprises:
a first portion formed from a first metal and having openings; and
a second portion formed from a second metal that at least partially obstructs the openings in the first portion, wherein the second metal is different from the first metal.

8. The electronic device of claim 7, further comprising:
control circuitry that is configured to apply a voltage to the first portion and to the second portion and to measure Seebeck voltages at junctions between the first portion and the second portion to determine a heat flux.

9. The electronic device of claim 1, wherein the resistive thermal device has a coated portion with a first optical absorption and an uncoated portion with a second optical absorption that is different from the first optical absorption, the electronic device further comprising:
control circuitry that is configured to drive the resistive thermal device with an alternating current waveform of sinusoidal frequency to heat the resistive thermal device and measure solar radiation based on the alternating current waveform and a temperature difference between the coated portion and the uncoated portion of the resistive thermal device.

10. An electronic device having an interior and an exterior, the electronic device comprising:
a housing that separates the interior from the exterior and that has an opening; and
a mesh on the exterior of the housing, wherein the mesh covers the opening, wherein the mesh comprises a plurality of intertwined strands, and wherein the plurality of intertwined strands includes a resistive thermal device wire that forms a hot wire anemometer.

11. The electronic device of claim 10, wherein the resistive thermal device wire comprises metal, the electronic device further comprising:
circuitry that provides a current to the metal to heat the metal from an original temperature to a desired temperature; and
control circuitry configured to calculate an air speed based on a decay time of the resistive thermal device wire from the desired temperature to the original temperature.

12. The electronic device of claim 11, further comprising:
a reference resistor in the interior, wherein the control circuitry is further configured to heat the reference resistor from an original reference temperature to a desired reference temperature, to monitor a decay time of the reference resistor from the desired reference temperature to the original reference temperature, and to determine an ambient temperature based on the decay time of the resistive thermal device wire and the decay time of the reference resistor.

13. The electronic device of claim 10, wherein the plurality of intertwined strands comprises an additional resistive thermal device wire, and wherein the resistive thermal device wire and the additional resistive thermal device wire are parallel to one another.

14. The electronic device of claim 10, wherein the plurality of intertwined strands comprises an additional resistive thermal device wire, and wherein the resistive thermal device wire and the additional resistive thermal device wire are perpendicular to one another.

15. The electronic device of claim 14, wherein the resistive thermal device wire comprises a first metal and the additional resistive thermal device wire comprises a second metal that is different from the first metal, the electronic device further comprising:
control circuitry that is configured to apply a voltage to the first metal and to the second metal and to measure Seebeck voltages at junctions between the first metal and the second metal to determine a heat flux.

16. The electronic device of claim 10, further comprising:
a reference resistor in the interior; and
a gasket interposed between the reference resistor and the resistive thermal device wire.

17. The electronic device of claim 10, wherein the plurality of intertwined strands comprises an additional resistive thermal device wire, the electronic device further comprising:
control circuitry configured to detect a presence of water by measuring a conductivity or capacitance between the resistive thermal device wire and the additional resistive thermal device wire and comparing the measured conductivity or capacitance to a conductivity or capacitance between the resistive thermal device wire and the additional resistive thermal device wire when separated by air.

18. An electronic device, comprising:
a housing that includes a front face, an opposing rear face, and sidewalls between the front face and the rear face;
a display at the front face of the housing;
an insulator on at least one of the front face, the rear face, or at least one of the sidewalls of the housing;
a layer of metal on the insulator;
a reference resistor in the housing; and
control circuitry configured to heat the layer of metal and the reference resistor from an original temperature to a desired temperature and to determine air speed based on a decay time from the desired temperature to the original temperature.

* * * * *